United States Patent [19]
Tamaru

[11] Patent Number: 4,821,124
[45] Date of Patent: Apr. 11, 1989

[54] DISC CASE HAVING REMOVABLE DISC AND SUB-TURNTABLE

[75] Inventor: Takuya Tamaru, Hamakita, Japan

[73] Assignee: Yamaha Corporation, Hamamatsu, Japan

[21] Appl. No.: 214,818

[22] Filed: Jul. 1, 1988

Related U.S. Application Data

[63] Continuation of Ser. No. 721,667, Apr. 10, 1985.

[30] Foreign Application Priority Data

Apr. 12, 1984 [JP] Japan ................................. 59-73584
Apr. 12, 1984 [JP] Japan ................................. 59-73585
Apr. 12, 1984 [JP] Japan ............................. 69-53970[U]

[51] Int. Cl.$^4$ ........................ G11B 23/03; G11B 5/012; G11B 33/02; B65D 85/30
[52] U.S. Cl. ................................. 360/133; 360/99.06; 369/772; 206/312
[58] Field of Search ................. 360/133, 97; 369/291, 369/57.2, 77.2; 206/444, 312

[56] References Cited

U.S. PATENT DOCUMENTS

| | | | |
|---|---|---|---|
| 3,526,884 | 9/1970 | Buslik | 360/133 |
| 4,208,117 | 6/1980 | Harvey et al. | 206/444 |
| 4,445,155 | 4/1984 | Takahashi et al. | 360/99 |
| 4,459,628 | 7/1984 | Barton | 360/133 |
| 4,476,978 | 10/1984 | Saito | 206/444 |
| 4,525,758 | 6/1985 | Nakagawa et al. | 360/133 |
| 4,571,718 | 2/1986 | Cahill et al. | 360/133 |
| 4,613,044 | 9/1986 | Saito et al. | 360/133 |
| 4,646,285 | 2/1987 | Ogusu et al. | 360/133 |
| 4,694,448 | 9/1987 | Tamaru et al. | 369/77.2 |

FOREIGN PATENT DOCUMENTS

| | | | |
|---|---|---|---|
| 0032771 | 7/1981 | European Pat. Off. | 369/291 |
| 0086682 | 8/1983 | European Pat. Off. | |
| 0158360 | 10/1985 | European Pat. Off. | |
| 0164597 | 12/1985 | European Pat. Off. | |
| 57-38387 | 5/1982 | Japan | |
| 58-14173 | 8/1983 | Japan | 360/97 |
| 60-405810 | 3/1985 | Japan | |
| 2072924 | 10/1981 | United Kingdom | |

OTHER PUBLICATIONS

European Search Report, 7/87.

Primary Examiner—Robert S. Tupper
Assistant Examiner—Melissa J. Koval
Attorney, Agent, or Firm—Cushman, Darby & Cushman

[57] ABSTRACT

A disc case is constructed for receiving a disc on which information data are recorded and for supporting the disc rotatably in the disc case. The disc case can be set into a reproducing apparatus with the disc received in the disc case. The disc case receives the disc releasably. During set into the reproducing apparatus, while the disc case is fixed in position within the reproducing apparatus, the disc is driven in rotation and thus the information data are reproduced by the reproducing apparatus.

4 Claims, 5 Drawing Sheets

DISC CASE HAVING REMOVABLE DISC AND SUB-TURNTABLE

This a continuation of application Ser. No. 721,667, filed Apr. 10, 1985, which was abandoned upon the filing hereof.

BACKGROUND OF THE INVENTION (a) Field of the Invention:

This invention relates to a disc case for receiving a disc on which information data are recorded and for supporting the disc rotatably in the disc case, the disc case being able to be set into a reproducing system with said disc received in said disc case.

Figure 1:
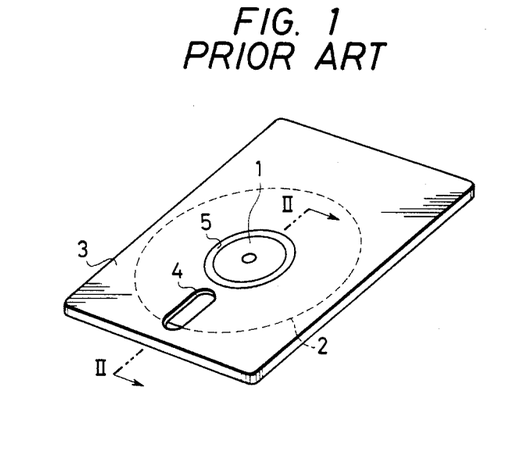
FIG. 1 is a perspective view showing an example of a conventional disc case.
Figure 2:
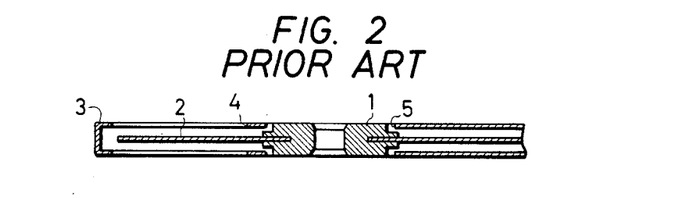
FIG. 2 is an enlarged sectional view along line II—II in FIG. 1.

(b) Description of the Prior Art:

There is already known such disc case of this kind as, for example, a case (cartridge) for floppy discs used in relation to various types of office automation equipment. As shown, for example, in FIGS. 1 and 2, this disc case comprises of a case 3 which receives a disc 2 to which a hub 1 is fixed, and a hole 4 for inserting a magnetic head of a reproducing apparatus and a hole 5 for connecting a turntable of the reproducing apparatus to the hub 1 are formed in said case 3.

However, the case for floppy discs as described above is handled always together with the disc, and accordingly the case is formed of a hard plastic so that generally the disc can not be taken out of the case. Therefore, in such case, there have been defects that the disc can not be replaced and that the case can not be used as a general purpose type disc case.

Now, a compact disc adopting a specific signal recording and reproducing system of the compact disc digital audio system is provided in the digital audio field recently achieving a splendid development. However, in the conventional compact disc player reproducing such compact discs, a type of utilizing the disc as set nakedly into the player is adopted and the disc has never been utilized as received in a case.

The reason is that, in the case of setting the disc together with the disc case into the player, the construction wherein the disc within is precisely fixed to a turntable on the player side and the disc and the turntable are made rotatable without interfering with the disc case is difficult to realize with the construction only on the disc case side.

SUMMARY OF THE INVENTION

An object of the present invention is to provide a general purpose type disc case wherein the disc is replaceable with respect to the case.

Another object of the present invention is to provide a disc case which can be set into a reproducing apparatus together with a replaceably received disc so as to be able to reproduce information data recorded on the disc.

A further object of the present invention is to provide a disc case which can prevent a disc supporting member which rotatably supports the disc within the case from slipping down particularly in the case of opening and closing the disc case to replace the disc.

These objects are achieved by a disc case for receiving a disc on which information data are recorded and for supporting the disc rotatably in the disc case, the disc case being able to be set into a reproducing apparatus with the disc received in the disc case, wherein the disc case receives the disc releasably and wherein, when set into the reproducing apparatus, while the disc case is fixed in position within the reproducing apparatus, the disc is driven in rotation and the information data are reproduced by the reproducing apparatus.

According to this invention, the disc case is constructed to releasably receive a disc and to rotatably support the disc when received, therefore a reproducing apparatus can be loaded with the disc together with the disc case so that the disc can be reproduced and can be replaced when taken out of the reproducing apparatus and, on the other hand, normally the disc case covers the disc so that a finger print can be prevented from being deposited on the disc in the case of handling the disc and the disc can be protected from any external force, dust and temperature, etc. Further, in the construction, a sub-turntable for supporting the disc is arranged within the disc case and is connected with the turntable of the reproducing apparatus so that the disc can be precisely fixed to the turntable by the sub-turntable and can be driven in rotation. Thus, the reproducing apparatus can be loaded with any kind of disc together with the disc case. Further, a clamping plate clamping the disc within the disc case in cooperation with the turntable of the reproducing apparatus is rotatably and unremovably held by an annular engaging wall provided on the disc case side so that the disc can be precisely fixed to the turntable of the reproducing apparatus by the clamping plate and that the clamping plate can be prevented from carelessly slipping down from the disc case even when the case is opened.

These and other objects of the present invention will become more apparent during the course of the following detailed description and appended claims.

DESCRIPTION OF THE PREFERRED EMBODIMENT

The present invention shall be explained in the following with reference to the drawings on the basis of the embodiment applied to the case of a compact disc of the compact disc digital audio system.

Figure 9:
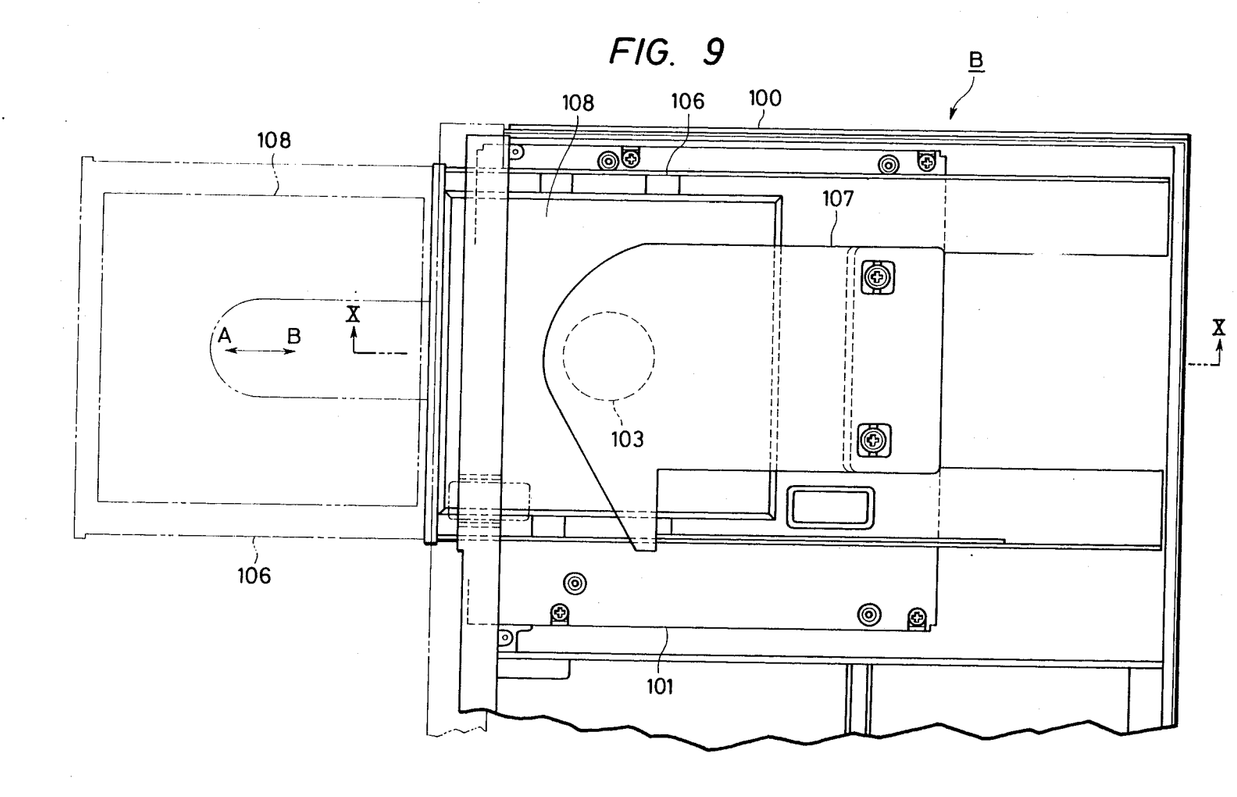
FIG. 9 is a schematic plan view showing an important part of the reproducing apparatus for reproducing the disc.
Figure 10:
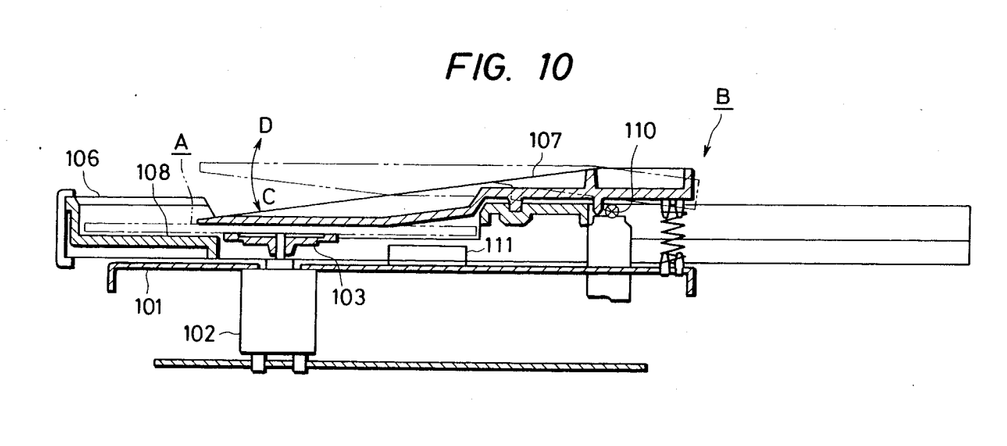
FIG. 10 is a sectional view along line X—X in FIG. 9.

FIGS. 3 to 8 are views showing the construction of a disc case A according to the present invention. FIGS. 9 and 10 are views showing an example of a reproducing apparatus B (compact disc player) reproducing a disc received in the disc case A.

Figure 6:
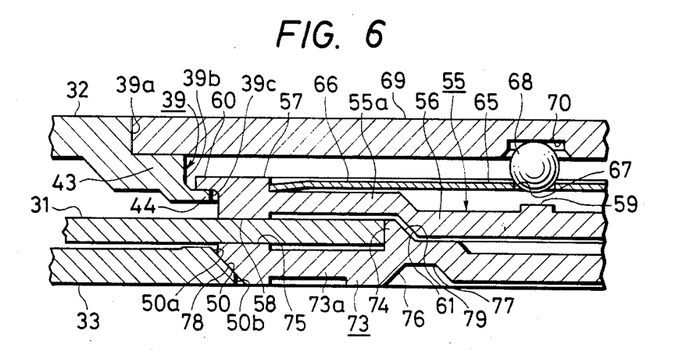
FIG. 6 is an enlarged sectional view along line VI—VI in FIG. 3, showing a sectional view in elevation of the sub-turntable prior to engagement by an external turntable.
Figure 7:
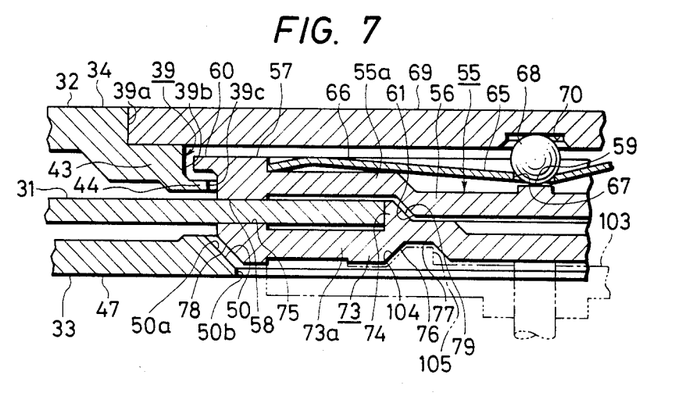
FIG. 7 is an enlarged sectional view along line VI—VI in FIG. 3, similar to FIG. 6 wherein the disc case is set into the reproducing apparatus.
Figure 8:
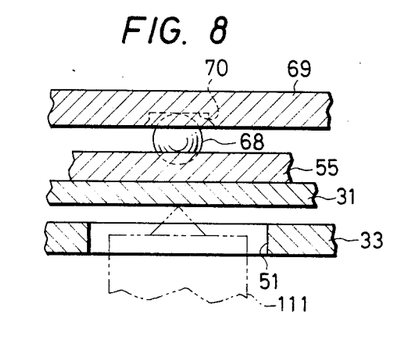
FIG. 8 is an enlarged sectional view along line VIII—VIII in FIG. 3, wherein the disc case is set into the reproducing apparatus.

First, the construction of the disc case A shown in FIGS. 3 to 8 shall be explained. The disc case A is to receive a disc (compact disc) 31, and an upper case 32 and lower case 33 of the disc case A are connected with each other so as to be free to open and close and a member rotatably pivoting the disc 31 is arranged within the disc case A. In the upper case 32, front and rear walls 35, 36 and right and left side walls 37, 38 are formed below the peripheral edge of a rectangular top plate 34 and a hole 39 is formed in the center of the top plate 34. In this case, in the rear wall 36, the thickness is larger than in the other walls and the downward projection length is also slightly larger than in other walls. The details of the part in which the hole 39 is formed of the top plate 34 are shown in FIGS. 6 and 7. As shown in these drawings, the part in which the hole 39 is formed of the top plate 34 is expanded downward on the lower surface and the hole 39 consists of an upward opening hole portion 39a, a center hole portion 39b of a diameter slightly smaller than the portion 39a and a downward hole portion 39c slightly smaller in the diameter than the portion 39b and vertically passing through the wall 39. In the following explanation, the part in which the hole portion 39b is formed shall be called a mounting wall 43 and the part in which the hole portion 39c is formed shall be called an engaging wall 44. Also, connecting holes 45 are formed respectively on both right and left sides of the rear wall 36 and engaging holes 46 are formed respectively on the front sides of the side walls 37 and 38 near the front wall 35.

Figure 3:
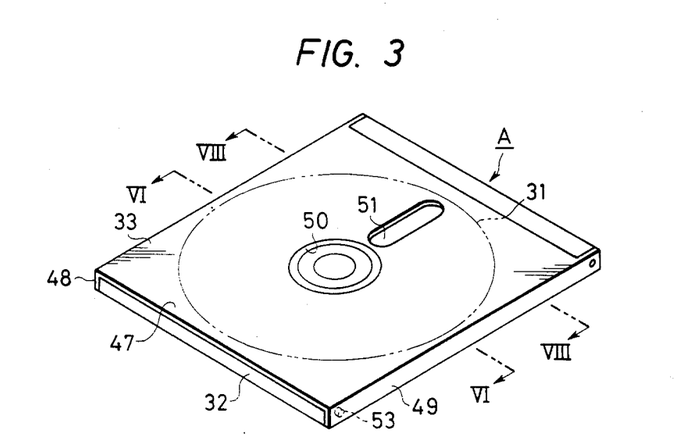
FIG. 3 is a perspective view showing the back surface of an embodiment of the disc case according to the present invention.
Figure 4:
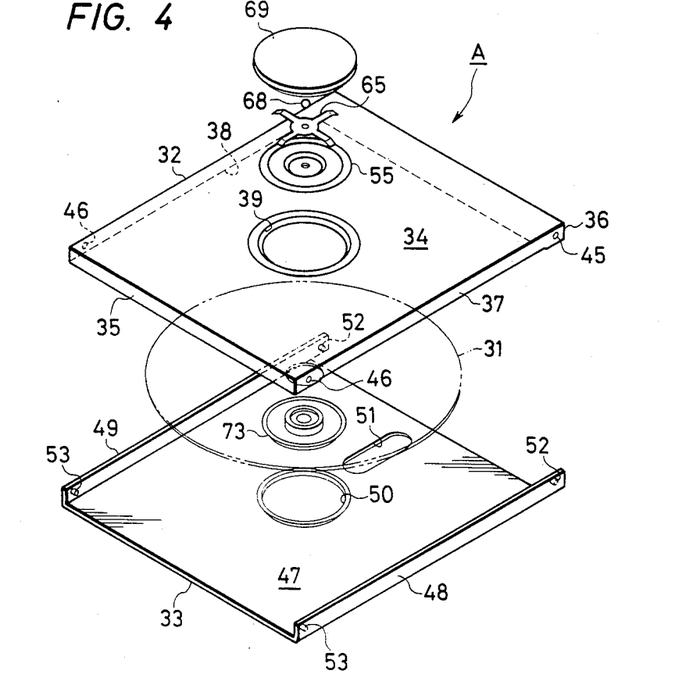
FIG. 4 is an exploded perspective view of the disc case in FIG. 3.
Figure 5:
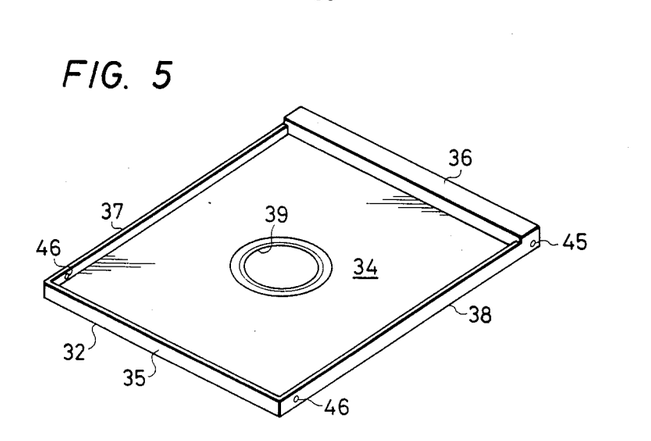
FIG. 5 is a perspective view showing the back surface of the upper case in FIG. 4.

In the lower case 33, right and left side walls 48, 49 are formed on the upper surfaces of both right and left side edges of a rectangular bottom plate 47. In the bottom plate 47, a hole 50 for inserting a turntable of a reproducing apparatus is formed in the center, and a laser beam introducing aperture 51 is formed. In this case, the side walls 48 and 49 project rearward at the rear ends by a predetermined length from the rear end of the bottom plate 47. Here, the distance between the right and left side walls 48 and 49 is such distance as can receive the upper case 32 as shown in FIG. 3. The length in the front and rear direction of the side walls 48 and 49 is equal to the length in the front and rear direction of the upper case. As shown in FIGS. 6 and 7, the hole 50 in the bottom plate 47 consists of a tapered part 50a becoming gradually smaller in the diameter downward from the upper surface of the bottom plate 47 and the same diameter part 50b of a very slight length connected to this tapered part 50a. Journals 52 which project inwardly are formed respectively inside the rear end parts of the side walls 48, 49 and engaging projections 53 are formed respectively inside the front end parts of the same. Here, engaging projections 53 form a locking mechanism to lock the upper case 32 and lower case 33 in closed state together with the engaging holes 46 in the upper case 32.

The upper case 32 and lower case 33 are connected with each other by positioning the upper case 32 between the right and left side walls 48 and 49 of the lower case 33 and engaging the right and left journals 52 respectively with the right and left connecting holes 45 in the upper case 32, and are free to open and close with the journal 52 as a rotation center. Here, in case the cases 32 and 33 are closed, as shown in FIG. 3, the space within the upper case 32 will be closed by the bottom plate 47 of the lower case 33. Also, in this case, the engaging projections 53 of the lower case 33 will engage respectively with the engaging holes 46 of the upper case 32 so that these cases 32 and 33 will not be carelessly opened.

A clamping plate 55 which is one member for clamping the disc 31 is fitted to the upper case 32 and is formed to be disc-shaped. As shown in FIGS. 6 and 7, the central part of the main wall 55a of the clamping plate 55 is a downward expanding engaging part 56. An upwardly projecting annular projecting wall 57 and a downwardly projecting annular clamping wall 58 are formed on the peripheral edge of the main wall 55a, a projection 59 is formed on the upper surface of the center part (the center part of the entire clamping plate 55) of the engaging part 56, an engaging wall 60 projecting radially outward of this clamping plate 55 is formed on the outer periphery of the projecting wall 57 and the outer peripheral part of the lower surface of the engaging part 56 is made as a tapered surface 61. This clamping plate 55 is arranged within the hole portion 39c of the hole 39 as engaged with the upper surface of the engaging wall 44 of the upper case 32.

A thrust spring 65 is fitted on the upper surface of the clamping plate 55, is constructed by forming a plate made of a spring steel to be cruciform, making the tip of each projecting part 66 slightly bent downward and providing a hole 67 formed in the center, and is fitted on the upper surface of the main wall 55a of the clamping plate 55 with the tips of the projecting parts 66 engaged with the inside surface of the projecting wall 57.

A steel ball 68 is mounted on the hole 67 of the thrust spring 65 and is pressed downward by a thrust receiving plate 69 secured to the upper case 32. In this case, a short cylindrical holding recess 70 is formed on the lower surface of the receiving plate 69 and is chamfered on the lower surface to be tapered. The steel ball 68 is held within this holding recess 70. The receiving plate 69 is a circular plate, is inserted and arranged within the hole portion 39a of the hole 39 in the upper case 32 and is secured on the peripheral edge to the upper case 32 by an adhesive means.

In the construction described above, the clamping plate 55 is rotatable within the hole 39 and is unremovable out of the hole 39 so as not to carelessly slip down from the case. This clamping plate 55 is normally biased downward by the thrust spring 65 so that, in the normal state, its engaging wall 60 will be engaged with the upper surface of the engaging wall 44 of the upper case 32 as shown in FIG. 6. As described later, in case the disc case A is set into the reproducing apparatus, as shown in FIG. 7, this clamping plate 55 will be pressed relatively upward by the turntable 103, the disc 31 will be moved upward as held between the clamping plate 55 and a later described sub-turntable 73 and the engaging wall 60 will be separated from the engaging wall 44. In this state, the clamping plate 55 can rotate, together with the thrust spring 65, with the steel ball 68 contacting the lower surface of the holding recess 70 of the receiving plate 69 as a center.

A sub-turntable 73 is arranged within the hole 50 in the lower case 33, is a disc-shaped member fitting the disc 31 and is also a cap closing the hole 50 in the lower case 33. The diameter of the main wall 73a of this sub-turntable 73 is substantially the same as the diameter of the main wall 55a of the clamping plate 55. In the main wall 73a, an upwardly projecting annular disc mounting wall 74 is formed in the central part of the upper surface thereof, an upwardly projecting clamping wall 75 is formed on the peripheral edge of the upper surface thereof and an annular groove 77 having a tapered surface 76 expanding in the diameter downward is formed on the lower surface thereof. The lower part of the outer peripheral surface of the main wall 73a is a tapered surface 78 becoming smaller in the diameter downward. The disc mounting wall 74 is of such outer diameter as can be inserted into the center hole of the disc 31 without any play and its inside surface is such tapered surface 79 as can be loosely fitted with the tapered surface 61 of the engaging part 56 of the clamping plate 55. This disc mounting wall 74 forms a disc holding part together with the clamping wall 75. The sub-turntable 73 having such form is arranged within the hole 50 of the lower case 33 normally as shown in FIG. 6 with the tapered surface 78 engaged with the tapered surface 50a.

The construction of the reproducing apparatus B shown in FIGS. 9 and 10 shall be explained in the following. In the drawings, the reference numeral 100 represents an outer case of the reproducing apparatus. A chassis 101 is arranged within this outer case 100. A motor 102 is fixed to the chassis 101. A turntable 103 is fixed to the rotating shaft of the motor 102 and is formed to be disc-shaped. As shown in FIG. 7, an annular projection 105 having a tapered surface 104 engageable with the groove 76 formed on the lower surface of the sub-turntable 73 of the disc case A is formed on the upper surface of the turntable 103. On the upper surface of the chassis 101, a tray 106 carrying the disc case A from the outside to the inside of the outer case 100 or vice versa is supported and a clamper 107 biasing the disc case A carried to the inside of the outer case 100 onto the turntable 103 is provided. The tray 106 has a disc case resting part 108 on its upper surface and is movable in the directions indicated by the arrows A and B between the position, which is indicated by the solid lines in FIG. 9 and in which the tray 106 is received within the outer case 100, and the position, which is indicated by the two-point chain lines in FIG. 9 and in which the tray 106 is pulled out to the outside through an opening formed in the outer case 100. The clamper 107 is rotatable in the directions indicated by the arrows C and D with the fulcrum 110 as a center between the position, in which the disc case A is fixed to the turntable 103 as indicated by the solid lines in FIG. 10, and the raised position indicated by the two-point chain lines.

The tray 106 and clamper 107 are so constructed as to be moved in synchronization with each other between the above mentioned two positions by a driving mechanism not illustrated. Further, the tray 106 is provided with a disc case elevating mechanism (not illustrated) whereby the disc case A when rested on a disc case resting part 108 is kept elevated by a predetermined height in the normal state so as to be lowered on the turntable 103 only when it is moved to be above the turntable 103. An optical head 111 reading out the signal (the information data) recorded on the disc is provided on the chassis 101.

The instruction of such operations of the reproducing apparatus as the operation of the tray 106 and clamper 107 and the playing operation is made by manipulating operating buttons not illustrated.

The method of handling the above mentioned disc case A and the method of reproducing the disc received in the disc case A shall be explained in the following.

First, the method of handling the disc case A shall be explained. In order to receive the disc 31 in the disc case A, the upper case 32 and lower case 33 are held separately and are rotated to be opened with the journal 52 as a center, and then the disc 31 is mounted on the upper surface of the sub-turntable 73 arranged within the hole 50 of the lower case 33. That is to say, the disc mounting wall 74 of the sub-turntable 73 is inserted relatively into the center hole of the disc 31. And the upper and lower cases 32 and 33 are rotated with the journal 52 as a center to be closed as shown in FIG. 3. Here, by the engagement of the engaging projection 53 of the lower case 33 with the engaging hole 46 of the upper case 32, the upper and lower cases 32 and 33 will be locked in closed state.

The disc 31 received within the disc case A as mentioned above will be clamped between the clamping wall 75 of the sub-turntable 73 and the clamping wall 58 of the clamping plate 55 as mounted to the disc mounting wall 74 of the sub-turntable 73 as shown in FIG. 6. That is to say, the clamping plate 55 mounted to the upper case 32 will be normally downward biased by the thrust spring 65, will therefore force the disc 31 against the clamping wall 75 of the sub-turntable 73 with its clamping wall 58, will thereby force the tapered surface 78 of the sub-turntable 73 against the tapered part 50a of the lower case 33 and will clamp the disc 31 in cooperation with the sub-turntable 73. In the case of downward pressing the disc 31, the clamping plate 55 will loosely fit the engaging part 56 within the disc mounting wall 74 of the sub-turntable 73. Here, as the outer peripheral surface of the engaging part 56 and the inner surface of the disc mounting wall 74 are respectively the tapered surfaces 61 and 79, even if the clamping plate 55 and the sub-turntable 73 are eccentric from each other, the tapered surfaces 61 and 79 will guide each other to center the clamping plate 55 and sub-turntable 73 with each other.

As the respective parts of the disc case A receiving the disc 31 as mentioned above cover substantially the entire range of the outside of the disc 31, the disc 31 can be protected from any external force, temperature and dust, etc. In this case, particularly the sub-turntable 73 will act to close the hole 50 of the lower case 33 to secure the above mentioned protection. Further, as the disc 31 is clamped by the clamping plate 55 and sub-turntable 73, the disc 31 can be held without any play.

In order to take the disc 31 out of the disc case A having received the disc 31 as mentioned above, in the order reverse to the above, the upper case 32 and lower case 33 may be opened and the disc 31 may be teken out of the sub-turntable 73. Thus, in this disc case A, the disc can be replaced with respect to the case.

The method of reproducing the disc 31 shall be explained in the following. First, when the operating button (not shown) for pulling the tray out of the reproducing apparatus B is operated to move the tray 106 in the direction indicated by the arrow A, the disc case resting part 108 of the tray 106 will be exposed outside the outer case 100 and the disc case A having received the disc 31 as mentioned above will be rested on the disc case resting part 108. Then, when the operating button (not shown) for receiving the tray is operated to move the tray 106 in the direction indicated by the arrow B, the disc case A will be brought above the turntable 103.

Here, the clamper 107 will rotate in the direction indicated by the arrow C from the position indicated by the two-point chain line in an interlocking way with the movement of the tray 106 and will force this disc case A against the turntable 103 when the movement of the tray 106 stops and the disc case A is positioned above the turntable 103.

At this time, the disc case A will be so positioned that the center of the hole 50 of the lower case 33 will coincide with the center of the turntable 103 as shown in FIG. 7 and will be pressed downward by the clamper 107 to advance the turntable 103 into the hole 50. In this case, the turntable 103 will contact the lower surface of the sub-turntable 73 closing the hole 50 and will elevate by a predetermined height the sub-turntable 73, disc 31 and clamping plate 55 against the biasing force of the thrust spring 65. When the turntable 103 contacts the sub-turntable 73, the annular projection 105 of the turntable 103 will engage with the groove 77 of the sub-turntable 73 and, in this case, the tapered surface 104 will guide the tapered surface 76 and thereby the sub-turntable 73, that is, the disc 31 will be centered with the turntable 103. Thus, the disc case A will be held between the clamper 107 and the turntable 103 while the sub-turntable 73 is in contact with the turntable 103. In this state, the engaging wall 60 of the clamping plate 55 and the tapered surface 78 of the sub-turntable 73 will be positioned as separated by a predetermined distance respectively from the engaging wall 44 of the upper case 32 and the tapered part 50a of the lower case 33. Further, the biasing force of the thrust spring 65 will become so strong that the clamping plate 55 and sub-turntable 73 will clamp the disc 31 with a stronger force.

After the reproducing apparatus B is loaded with the disc 31 and disc case A, if the playing button (not shown) is operated, the motor 102 will start, the turntable 103 will rotate, thereby the disc 31 will rotate together with the sub-turntable 73, clamping plate 55, thrust spring 65 and steel ball 68, the optical head 111 will emit a laser beam to the disc 31 through the laser beam introducing aperture 51, the reflected beam by the disc 31 will be detected to read the signal recorded on the disc 31, and information and data on the disc 31 will be reproduced. Further, the rotation friction resistance of the steel ball 68 to the upper case 32 will be so small that the respective members holding the disc 31 will be able to be smoothly rotated and therefore the disc 31 will be able to be correctly reproduced.

Thus, the reproducing apparatus B can be loaded with the disc case A together with the disc as mentioned above and the disc can be replaced as taken out of the reproducing apparatus B.

The disc case of the present invention can be variously modified on the basis of the construction of the above mentioned disc case A.

For example, the laser beam introducing aperture 51 formed in the lower case 33 may be so formed as to be closed with a transparent plate. If it is formed in such way, dust will be able to be more positively prevented from coming in and the disc will be able to be more positively protected from an extended force and a high temperature.

Also, the mechanism of locking the upper case 32 and lower case 33 when closed is not limited to the projection-hole engaging construction at the front end of each of both right and left sides as mentioned above but may be provided in either of both case engaging parts. Further, both closed cases may be locked in with a lock pin or an engaging piece and engaged piece of proper shape may be provided respectively in both cases to be engaged with each other to lock the cases.

What is claimed is:

1. A disc case for enclosing a disc on which data is recorded comprising a first case member and a second case member, said case members including means for allowing relative movement of said case members between open and closed positions to allow insertion and removal of a disc in an axial direction from a space defined by said case members when in said closed position, one of said case members having aperture means to permit a disc enclosed within said case members to be read by a reproducing apparatus, a disc supporting means carried within said space so as to support a disc disposed in said space for rotation when said case members are in said closed position, said disc supporting means including a member engageable by a disc rotating member of the reproducing apparatus so that the disc is rotatable in said case by the disc rotating member, said second case member being provided with an opening through which the disc rotating member of the reproducing apparatus is insertable, and wherein, when said disc case with said disc contained is set in the reproducing apparatus, the disc rotating member of the reproducing apparatus will be inserted through said opening into said space and will support said disc rotatably in cooperation with said disc supporting means, said disc supporting means comprising a sub-turntable having a connecting part which can be connected to the disc rotating member of the reproducing apparatus and having a disc holding part for holding said disc, said disc supporting member further including a disc clamping plate which clamps said disc between said clamping plate and said sub-turntable in cooperation with said sub-turntable, said disc supporting member further comprising a thrust spring which acts on said clamping plate to impart a clamping force to clamp said disc between said clamping plate and said sub-turntable, wherein said disc supporting member further comprises:

a steel which supports said sub-turntable, said clamping plate and said thrust spring rotatably.

2. A disc case for enclosing a disc on which data is recorded comprising a first case member and a second case member, said case members including means for allowing relative movement of said case members between open and closed positions to allow insertion and removal of a disc in an axial direction from a space defined by said case members when in said closed position, one of said case members having aperture means to permit a disc enclosed within said case members to be read by a reproducing apparatus, a disc supporting means carried within said space so as to support a disc disposed in said space for rotation when said case members are in said closed position, said disc supporting means including a member rotatably supported by the first case member and for rotatably clamping the disc by cooperation with a disc rotating member of a reproducing apparatus so that the disc is rotatably in said case by the disc rotating member;

said disc and the reproducing apparatus being constructed as an optical recording and reproducing system including a light beam where said light beam is introducable from said reproducing apparatus through said aperture, wherein said first case member has an annular engaging wall formed thereon, on which said clamping plate is held rotatably.

3. A disc case for enclosing a disc on which data is recorded comprising a first case member and a second case member, said case members including means for allowing relative movement of said case members between open and closed positions to allow insertion and removal of a disc in an axial direction from a space defined by said case members when in said closed position, one of said case members having aperture means to permit a disc enclosed within said case members to be read by a reproducing apparatus, a disc supporting means carried within said space so as to support a disc disposed in said space for rotation when said case members are in said closed position, said disc supporting means including a member rotatably supported by the first case member and for rotatably clamping the disc by cooperation with a disc rotating member of a reproducing apparatus so that the disc is rotatably in said case by the disc rotating member;

said disc and the reproducing apparatus being constructed as an optical recording and reproducing system including a light beam where said light beam is introducable from said reproducing apparatus through said aperture, wherein said fist case member has an annular engaging wall formed thereon, on which said rotatably supported plate is held rotatably.

4. A disc case according to claim 3, wherein said disc case further comprises:

locking means for holding said first and second case members in said closed position when said first and second case members close each other.

* * * * *